US009218164B2

(12) United States Patent  (10) Patent No.: US 9,218,164 B2
Ortiz  (45) Date of Patent: *Dec. 22, 2015

(54) SYSTEM AND METHOD FOR MOBILE APPLICATION DEVELOPMENT USING MOBILE DEVICES

(71) Applicant: Norman Ortiz, Guaynabo, PR (US)

(72) Inventor: Norman Ortiz, Guaynabo, PR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/226,879

(22) Filed: Mar. 27, 2014

(65) Prior Publication Data

US 2015/0007131 A1   Jan. 1, 2015

Related U.S. Application Data

(63) Continuation-in-part of application No. 13/245,282, filed on Sep. 26, 2011, now Pat. No. 8,694,954.

(51) Int. Cl.
| | |
|---|---|
| *H04W 4/00* | (2009.01) |
| *G09G 3/34* | (2006.01) |
| *H04M 3/00* | (2006.01) |
| *G06F 17/00* | (2006.01) |
| *G06F 17/22* | (2006.01) |
| *G06F 3/00* | (2006.01) |
| *G06F 3/048* | (2013.01) |
| *G06F 9/44* | (2006.01) |
| *G06F 3/0483* | (2013.01) |
| *G06F 3/0482* | (2013.01) |

(52) U.S. Cl.
CPC ............... *G06F 8/31* (2013.01); *G06F 3/0482* (2013.01); *G06F 3/0483* (2013.01); *G06F 8/38* (2013.01); *G06F 9/4446* (2013.01)

(58) Field of Classification Search
CPC .............. G06F 8/20; G06F 8/30; G06F 8/24; G06F 9/44505; G06F 2209/482; G06F 8/34; G06F 9/445; H04L 69/329; H04L 29/06; H04L 67/02

See application file for complete search history.

(56) References Cited

U.S. PATENT DOCUMENTS

| | | | | |
|---|---|---|---|---|
| 7,734,999 B2 * | 6/2010 | Leung | .................. | G06F 17/243 715/222 |
| 7,764,956 B2 * | 7/2010 | Herberger | ................ | G06F 8/34 455/418 |
| 7,784,030 B2 * | 8/2010 | Christfort | ................ | G06F 8/20 717/110 |
| 7,813,910 B1 * | 10/2010 | Poulin | ................ | G06F 11/3457 715/771 |
| 2002/0033843 A1 * | 3/2002 | Loos | ....................... | G06F 9/445 715/740 |
| 2004/0027326 A1 * | 2/2004 | Hays | ........................ | G06F 8/38 345/106 |
| 2004/0240408 A1 * | 12/2004 | Gur | ........................... | G06F 8/61 370/328 |
| 2005/0076327 A1 * | 4/2005 | Helal | ........................ | G06F 8/20 717/100 |
| 2006/0129972 A1 * | 6/2006 | Tyburski | ................... | G06F 8/61 717/106 |
| 2006/0150144 A1 * | 7/2006 | Balathandapani | ........ | G06F 8/20 717/106 |
| 2006/0218482 A1 * | 9/2006 | Ralston | ................... | H03M 7/40 715/201 |
| 2007/0220494 A1 * | 9/2007 | Spooner | .................... | G06F 8/30 717/130 |
| 2009/0254912 A1 * | 10/2009 | Roundtree | ................ | G06F 8/61 717/106 |
| 2009/0300578 A1 * | 12/2009 | Neil | ....................... | G06F 9/4443 717/104 |
| 2010/0037204 A1 * | 2/2010 | Lin | .................... | G06Q 30/0267 717/106 |
| 2010/0174974 A1 * | 7/2010 | Brisebois | .............. | G06F 17/243 715/223 |

* cited by examiner

*Primary Examiner* — Don Wong
*Assistant Examiner* — Anibal Rivera
(74) *Attorney, Agent, or Firm* — Eugenio J. Torres-Oyola; Ferraiuoli LLC

(57) ABSTRACT

The present invention is a system to develop mobile applications from a mobile device that includes a database with a memory, a hosting space, an app-creation application with a plurality of options stored on a mobile application repository on said memory over a communications network or within the mobile device. A client device downloads and installs the app-creation application from the mobile applications repository over a communications network to create said mobile applications. There are four methods for mobile application development created by the mobile device that utilize this system.

14 Claims, 5 Drawing Sheets

SYSTEM AND METHOD FOR MOBILE APPLICATION DEVELOPMENT USING MOBILE DEVICES

RELATED APPLICATIONS

This application claims priority to U.S. Provisional Application 61/417,536 filed on Nov. 29, 2010 and U.S. Non-Provisional application Ser. No. 13/245,282, the entire disclosure of which is incorporated by reference.

STATEMENT REGARDING FEDERALLY SPONSORED RESEARCH AND DEVELOPMENT

N/A

BACKGROUND OF THE INVENTION

Field of the Disclosure

The present invention relates to a system and method for mobile application development. More specifically, the present invention relates to a system and method for native and web mobile application development.

SUMMARY

It is an object of the present invention to provide a system and method to develop an mobile application utilizing a mobile device such as a smartphone, wearable smart devices, a personal digital assistant (PDA) or a tablet computer.

It is an object of the present invention to provide a system and method for developing a mobile application that does not require a user to know any programming language.

It is an object of the present invention to provide a system and method for developing a mobile application that does not require a user to know any programming language.

By selecting options and filling out fields presented to the user, a mobile application may be generated and saved on a web hosting. Thus, the user may be able to create mobile applications for use on mobile devices, such as smartphones, personal digital assistants (PDA), tablet devices, touch screen computers, as well as desktop computers, without having to know a programming language or how to write computer code. The mobile applications are developed by presenting a wizard-like process or multi-tab options to a user. The user can then choose from the options available and input information that will be displayed in the created application.

BRIEF DESCRIPTION OF THE DRAWINGS

The present invention will be described, by way of exemplary embodiments, but not limitations, illustrated in the accompanying drawing in which like references denote similar elements, and in which.

DETAILED DESCRIPTION OF ILLUSTRATIVE EMBODIMENTS

Figure 1:
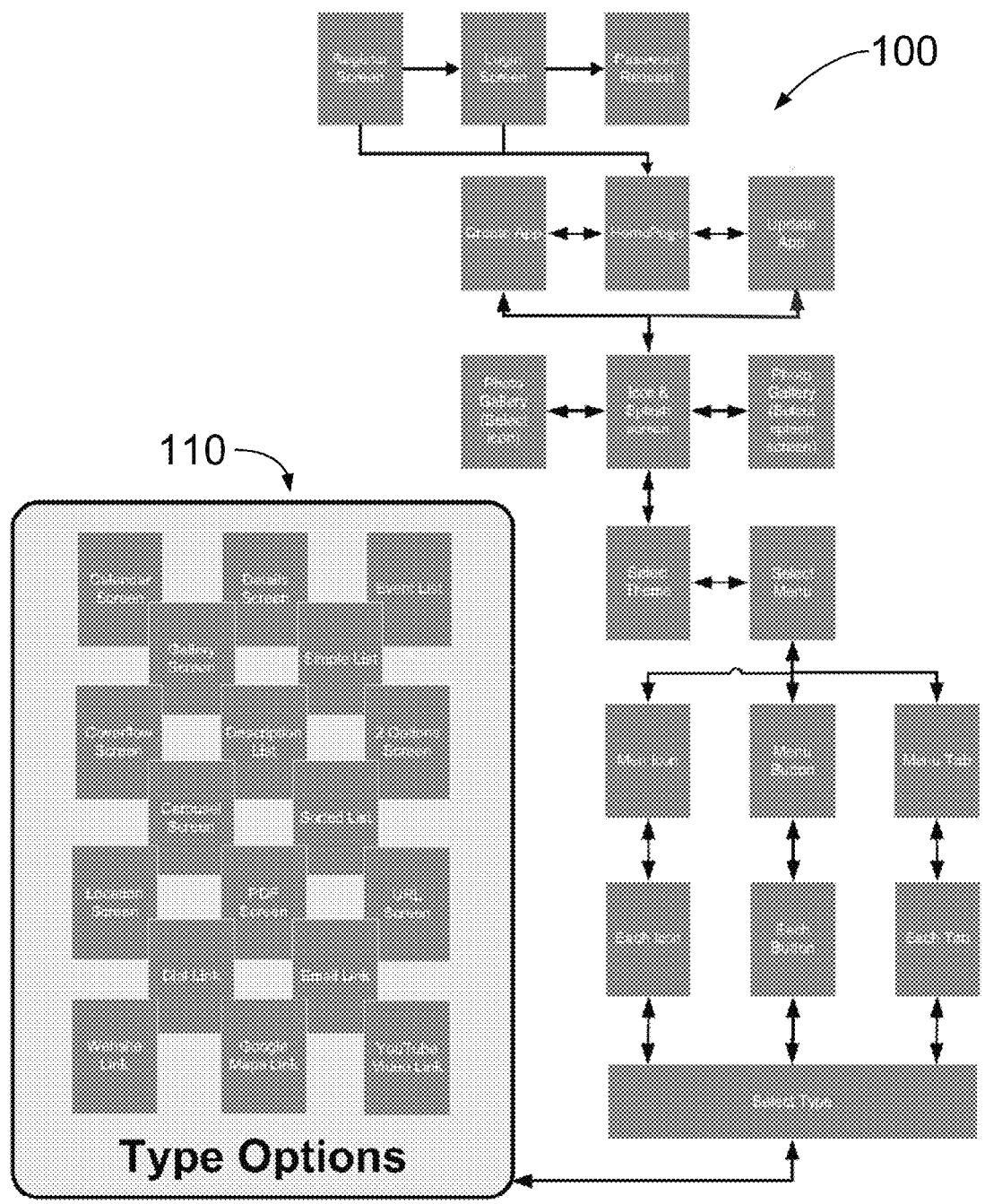
FIG. 1 illustrates a flow chart of a process diagram for mobile application development, in accordance with one embodiment of the present invention.

The embodiments of the invention disclosed herein may be implemented, through the use of general-programming languages (such as C or C++). The program code can be disposed in any known computer-readable medium including semiconductor, magnetic disk, or optical disk (such as CD-ROM, DVD-ROM). As such, the code can be transmitted over communication networks including the Internet.

In the present disclosure, the terms "computer program medium" and "computer-usable medium" are used to generally refer to media such as a removable storage unit or a hard disk drive. Computer program medium and computer-usable medium can also refer to memories, such as system memory and graphics memory which can be memory semiconductors (e.g., DRAMs, etc.). These products are examples of how to provide software to a computer system.

The embodiments are also directed to computer products comprising software stored on any computer-usable medium. Such software, when executed in one or more data processing devices, causes a data processing device(s) to operate as described herein or, allows for the synthesis and/or manufacture of computing devices (e.g., ASICs, or processors) to perform embodiments described herein. Embodiments employ any computer-usable or -readable medium, and any computer-usable or -readable storage medium known now or in the future. Examples of computer-usable or computer-readable mediums may include, but are not limited to, primary storage devices (e.g., any type of random access memory or read-only memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

For purposes of this discussion, the term "module" may include at least one of software, firmware, and hardware (such as one or more circuits, microchips, or devices, or any combination thereof), and any combination thereof. In addition, it will be understood that each module may include one or more components within an actual device, and each component that forms a part of the described module can function either cooperatively or independently of any other component forming a part of the module. Conversely, multiple modules described herein may represent a single component within an actual device. Further, components within a module may be in a single device or distributed among multiple devices in a wired or wireless manner.

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention. However, the order of description should not be construed as to imply that these operations are necessarily order dependent. In particular, these operations need not be performed in the order of presentation.

The phrase "in one embodiment" is utilized repeatedly. The phrase generally does not refer to the same embodiment, however, it may. The terms "comprising", "having" and "including" are synonymous, unless the context dictates otherwise.

FIG. 1 illustrates a flow chart of a process diagram 100 for mobile application (app) development, in accordance with one embodiment of the present invention. A plurality of screen type options 110 are also described in FIG. 1 and are selected by the user from the group consisting of, but not limited to, a calendar screen, a details screen, an events screen, an image gallery screen, horizontal and vertical image or content scrolling, single image screen, a survey screen, a poll screen, a chart screen, a simple list, a coverflow screen, a description list, a 2 and 3 option buttons screen, a carousel screen, a sorted list, a contacts list, a list of images, feed data screen from sources like FACEBOOK, TWITTER, LINKED IN, Google GOOGLE, RSS, WORD PRESS, JOOMLA, BLOGGER (among others), a location map screen, a PDF screen, a URL screen, a dial link, an SMS text link, an e-mail link, a website link, link to other native apps and an internet video link. Other screen type options 110 can also be utilized with the system 100.

A series of wizard-like screens may help guide the user through the steps of creating a mobile application by requesting all of the information necessary to produce the particular mobile application desired by the user. Although the process of creating a mobile application is described in one specific order, the process of creating the mobile application may be created in any desired order. Some steps or fields may be ignored or omitted by the user and a default value should be assigned. New options and steps may be added to the process to enhance the features and screens of the mobile applications. For example, as shown process diagram 100, the process for mobile application development may include steps directed to access the mobile application. The steps directed to access may include a registration screen or login Screen requesting a password. Another step may include start developing or editing an existing application. During said step the user may be provided with a main screen to select the creation of a new app or updating an existing app. Further other steps or fields may include selecting a theme, selecting icons and splash screen and others as shown in FIG. 1.

Using a mobile device 410, the user U may download and install an app-creation application from a mobile application repository or marketplace into the mobile device. The app-creation application allows a user U to create one or more applications from a user's mobile device. After the app-creation application launches, the user's information may be gathered and the user may be registered. Once the user is registered, a personal space may be set for the user to be able to store the user's information as well as the user's created mobile applications. The user may then decide whether to create a new mobile application or to update an already-created mobile application. If the user chooses to create a new mobile application, the user may be requested by the app-creation application to enter certain information such as the name, category, and description for the new mobile application, as well as any other suitable information.

In the app-creation application, once the user has provided the general information for the mobile application to be created, the wizard-like or tab selection process may begin. The user may be requested to select an icon image and splash screen image for the new mobile application, as well as to select a starting menu page for the new mobile application. The user may be able to choose the icon image and/or the splash screen image from the images on the device or from images online. If the user does not select an icon image and/or a splash screen image, a default icon image and/or a default splash screen image may be automatically provided.

Once the user selects the type of menu screen, the user may select from a set of alternative screens that may be added to the mobile application. This alternative screens are a series of template driven screens that will be available for the user to select from, and each of the template screens may have its own required fields that the user may be requested to fill out. Some of the template screens may be able to link to other template screens, and the user may be able to decide how deep or complex the new mobile application will be. New template screens and features may be added to the application.

Once the user has completed all of the desired screens for the new mobile application, the user may submit all of the data, including images, information, and settings to the database and hosting space location for compiling and to generating the code, such as Hypertext Markup Language and/or JavaScript or any other suitable languages, that will create the new mobile application for the user. Thus, in just a few seconds, the new mobile application will be created and available to the user. Using the app-creation application, the new mobile application may be updated and resubmitted.

The app-creation application may be used on a mobile device, such as, but not limit to, a device running the IOS™ or Android™ operating systems. Alternatively, the app-creation application may also be run from a desktop, laptop, tablet, wearable smart device and any other device with programmable features for creating mobile applications. An Internet connection may only be needed if the database, hosting space or application generator resides outside the mobile device.

Figure 2:
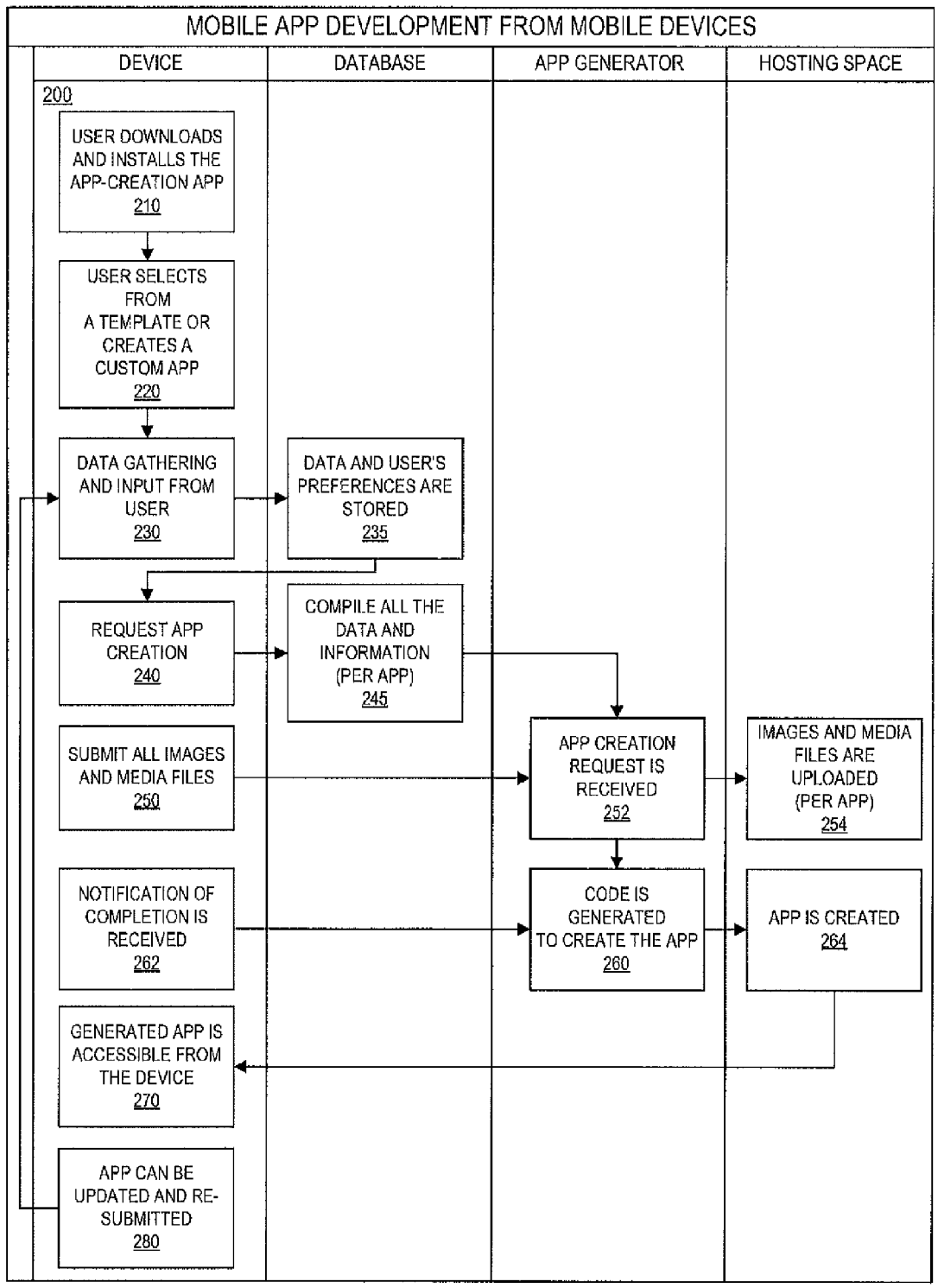
FIG. 2 illustrates a flow chart of a method for mobile application development, in accordance with one embodiment of the present invention.

FIG. 2 illustrates a flow chart of a method 200 for mobile application development, in accordance with one embodiment of the present invention.

The method 200 includes a user downloading and installing an app-creation application 210, user selecting from a template or creating a customized app 220, gathering data from a user 230, storing a plurality of data and user preferences 235, requesting application creation 240, compiling all of the data and applications 240, submitting all data and images for application creation 250, receiving application request 252, uploading media images and files 254, generating code to create a plurality of application screens 260, receiving notification of completion 262, creating app 264, accessing the new application from a mobile device 270 and updating and resubmitting application as needed 280. Further the method 200 for mobile application development includes the updating and resubmitting application as another input for the gathering data from a user 230.

Downloading and installing an app-creation application 210 includes downloading and installing the app-creation application from a website over a communications network such as the Internet or from a media such as a flash memory card or other suitable media. User selecting from a template or creating a customized app 220 includes choosing from a plurality of provided suitable templates or customizing tools. Gathering data from a user 230 includes gathering data from a plurality of wizard-like screens or from a plurality of tab selection screens. Storing a plurality of data and user preferences 235 includes storing the gathered data on a dedicated hosting space composed of a storage capacity on a server system and/or locally in the mobile device. Requesting application creation 240 requires the generator system to receive a request from the user. Compilation and submission of all the data, content and information 245 is done by the device and database, which could reside inside the device or externally in a server. Receiving an app creation request 252 can be done over any suitable communications network such as the Internet. Submitting all data and images for application creation 250 can occur after submitting all data and images for application creation 252 is done by the server system and the app creation tool. Uploading media images and files 254 can also occur after submitting all data and images for application creation 252 is done by the server system and the app creation tool. Generating code to create a plurality of application screens 260 is generated from an external web hosting that is in communication with the server system. Receiving notification of completion 262 is completed over the Internet typically or by any other suitable notification. Creating app 264 then straightforwardly includes creating the app. Accessing the newly created application from a mobile device 270 can be done by any mobile device or computerized device in communication with the hosting space were the application resides. The mobile device is selected from the group consisting of a smartphone, a personal digital assistant or a tablet computer. Updating and resubmitting application as needed 280 can also be done by any mobile device or computerized device in communication with the hosting space.

Figure 3:
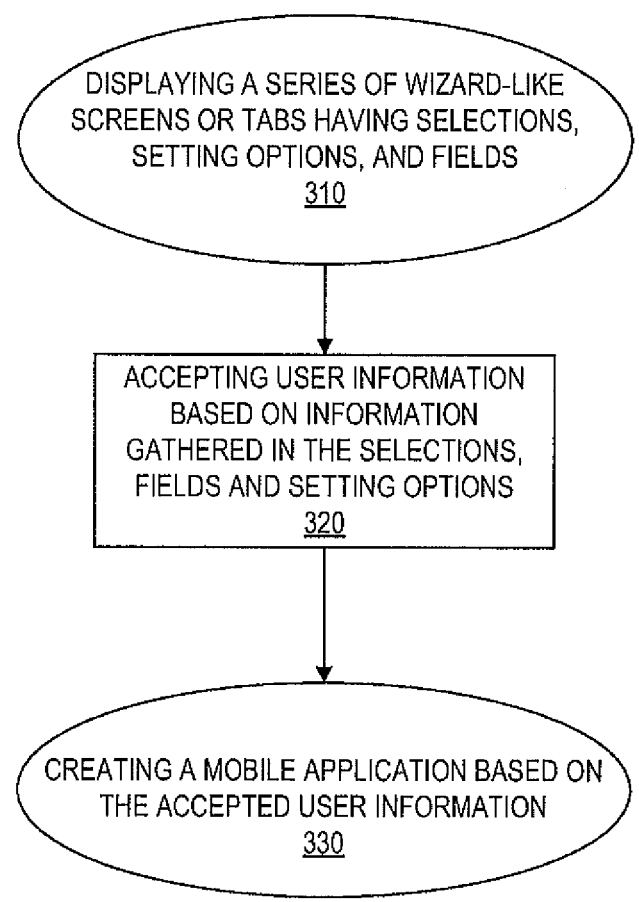
FIG. 3 illustrates a process diagram for mobile application development, in accordance with one embodiment of the present invention.

FIG. 3 illustrates a second flow chart of a method 300 for mobile application development, in accordance with one embodiment of the present invention.

The method 300 includes displaying a series of wizard-like screens or tabs having selections, setting options, and fields 310, accepting user information based on information gathered in the selections, fields and setting options 320 and creating a mobile application based on the accepted user information 330.

Displaying a series of wizard-like screens or tabs having selections, setting options and fields 310 includes choosing a plurality of options. Accepting user information based on information gathered in the selections, setting options and fields 320 is performed by the overall system described in FIG. 1A. Creating a mobile application based on the accepted user information 330 is performed by the generator system that creates and generates a plurality of computer code. The computer code creates a plurality of screens that become part of the app generated. The method 300 utilizes a mobile device selected from the group consisting of a smartphone, a personal digital assistant or a tablet computer as previously described in FIGS. 1A and 1B.

Figure 4A:
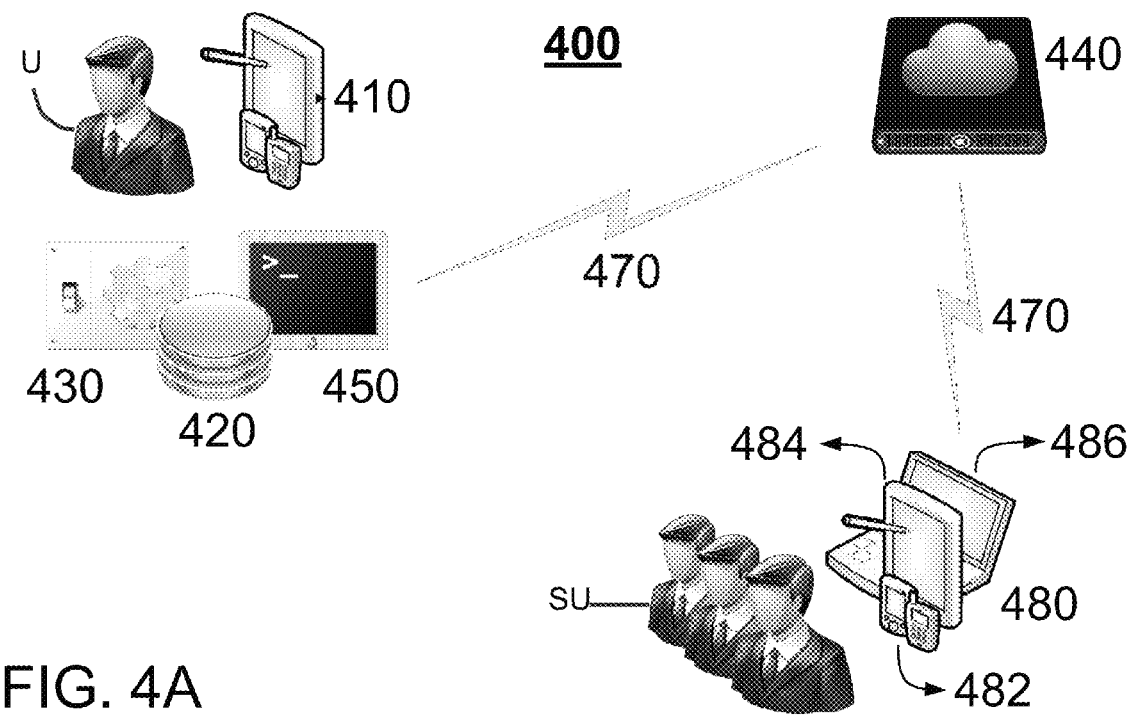
FIG. 4A illustrates a first system configuration of a system to develop a mobile device application, in accordance with one embodiment of the present invention.

FIG. 4A illustrates a first system configuration 400 of a system to develop a mobile device application, in accordance with one embodiment of the present invention.

The first system configuration 400 includes a mobile device 410, a database 420 and an app-creation application 430. The system 400 to develop a mobile device application also includes a server system 440, a code generator 450, an app-creation application 430 and a communications network 470. These components of the first system configuration 400 are the same as the components and supplemental features described in FIGS. 1A and 1B. The first system configuration 400 has the mobile device 410, the database 420, the code generator 450 and the app-creation application 430 grouped together that are in communication with the server system 440 over the communications network 470. The server system 440 is then in communication with a client device 480 over the app-creation application 430 communications network 470 utilized by a second user SU. The client device 480 is similar to the mobile device 410 and is selected from the group consisting of a smartphone 482, a tablet computer 484 or a personal computer 486. The app-creation application 430 is downloaded from the code generator 450 to the server system 440 over the communications system 470 and then from the server system 440 to the client device 480.

Figure 4B:
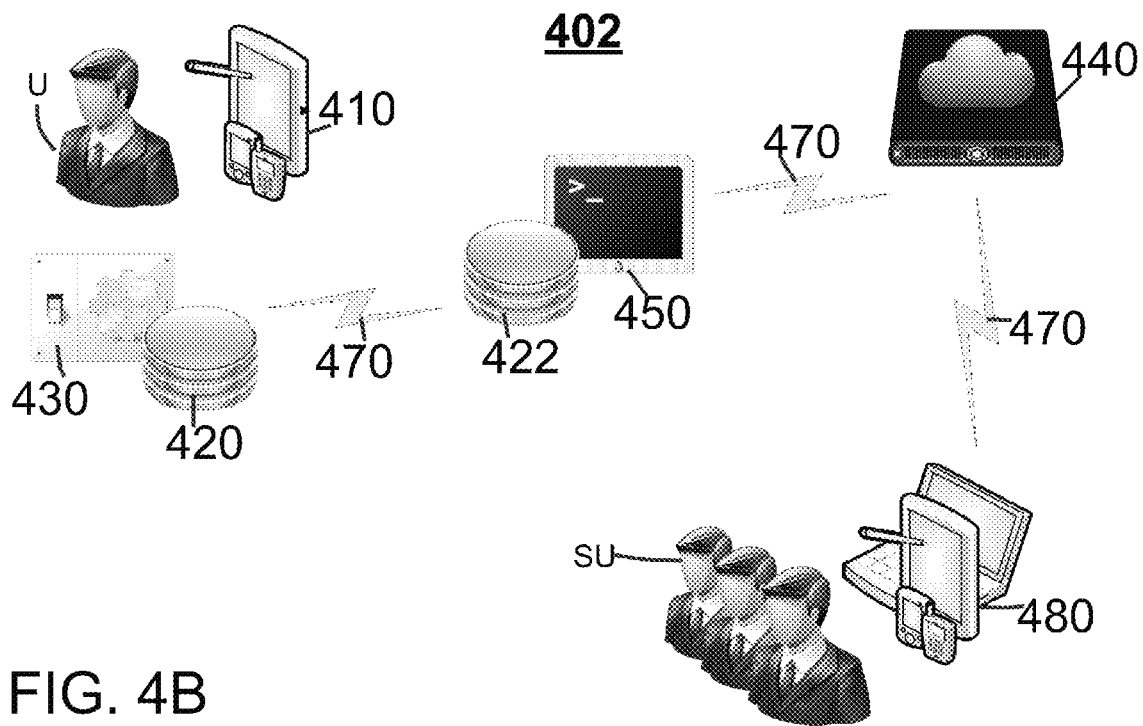
FIG. 4B illustrates a second system configuration of a system to develop a mobile device application, in accordance with one embodiment of the present invention.

FIG. 4B illustrates a second system configuration 402 of a system to develop a mobile device application, in accordance with one embodiment of the present invention. These components of the second system configuration 402 are the same as the components and supplemental features described in FIG. 4A.

In the second system configuration 402, the mobile device 410, the database 420 and the app-creation application 430 are grouped together and are in communication with a second database 422 and the code generator 450. The second database 422 and the code generator 450 are then in communication with the server system 440 which is in communication with the client device 480. All communications within the second system configuration 402 are done over the communications network 470.

Figure 4C:
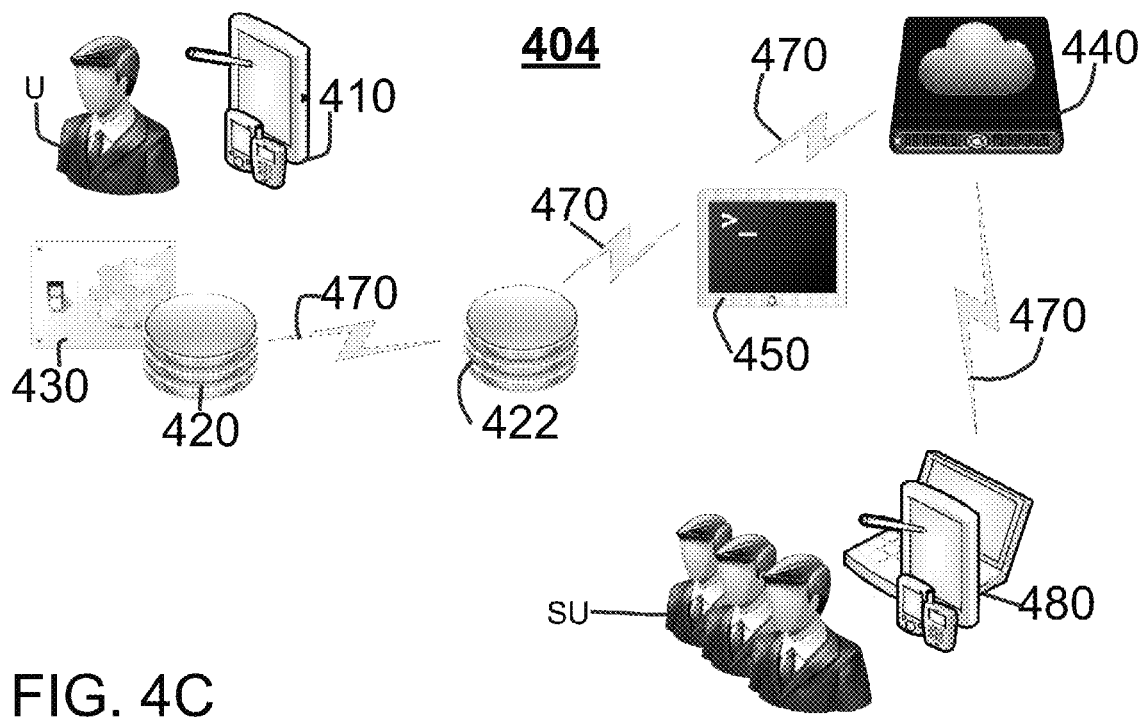
FIG. 4C illustrates a third system configuration of a system to develop a mobile device application, in accordance with one embodiment of the present invention.

FIG. 4C illustrates a third system configuration 404 of a system to develop a mobile device application, in accordance with one embodiment of the present invention. These components of the third system configuration 404 are the same as the components and supplemental features described in FIG. 4A.

In the third system configuration 404, the mobile device 410, the generator 430, the database 420 and the app-creation application 430 are grouped together and are in communication with the code generator 450. The code generator 450 is then in communication with a server system 470 which in turn is in communication with a client device 480. The app-creation application 430 is created from the mobile device 410 and downloaded from the mobile device 410 to a second database 422 where it can be stored. The app-creation application 430 is then downloaded to the server 440 and then to the client device 480. All communications within the third system configuration 404 are done over the communications network 470.

Figure 4D:
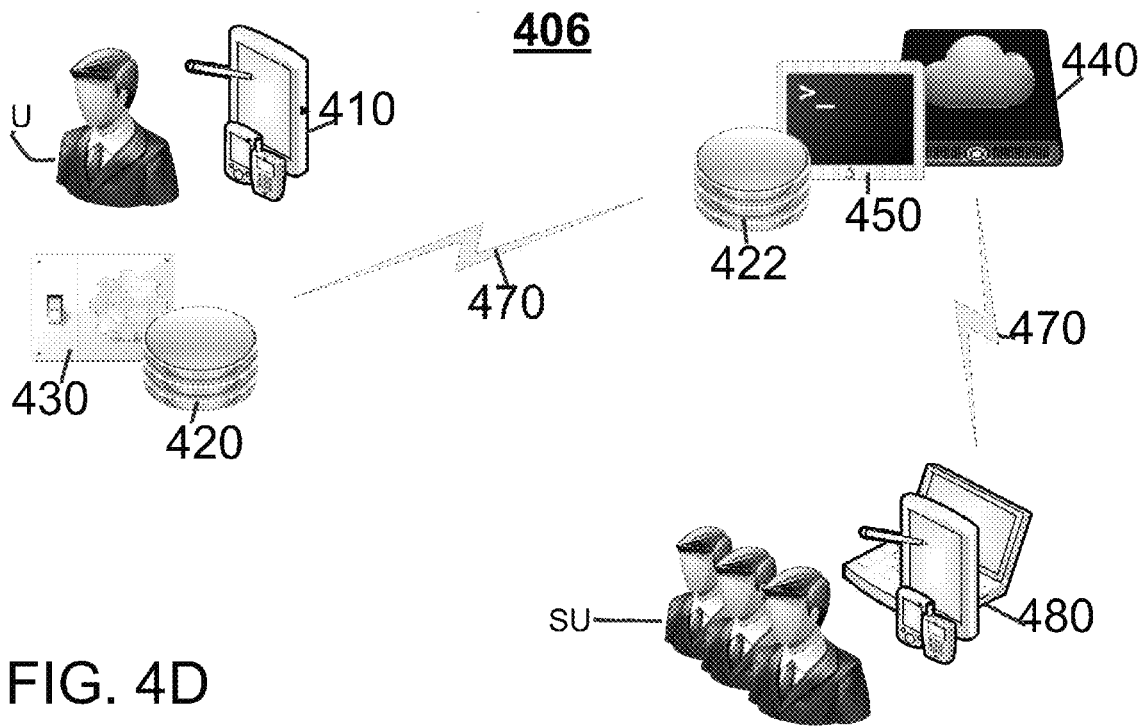
FIG. 4D illustrates a fourth system configuration of a system to develop a mobile device application, in accordance with one embodiment of the present invention.

FIG. 4D illustrates a fourth system configuration 406 of a system to develop a mobile device application, in accordance with one embodiment of the present invention.

These components of the fourth system configuration 404 are the same as the components and supplemental features described in FIGS. 4A and 4B.

In the fourth system configuration 406, the mobile device 410, the first database 420 and the app-creation application 430 are grouped together and are in communication with the second database 422 that can store a downloaded app-creation application 430. The second database 422 is grouped with the code generator 450 and the server system 440 and is in communication with the client device 480. The app-creation application 430 can be created on the mobile device 410 and downloaded to the second database 422 as well as be stored on the first database 420. The app-creation application 430 can then be downloaded to the client device 480. All communications within the second system configuration 402 are done over the communications network 470.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

The invention claimed is:

1. A system to develop a portable device application with a portable device module, comprising:
 a server system that includes a hosting space and a database,
 wherein said database with a first non-transitory computer-usable medium, a code generator, and an app-creation application with a plurality of options stored on a mobile application repository on said first non-transitory computer-usable medium, wherein said plurality of option includes a series of template driven screens;
 a network communications medium; and
 a portable device module comprising a second non-transitory computer-usable medium, wherein said portable device module is in communication with said server system to download, gather and install said app-creation application including said series templates driven screens from said mobile application repository over said network communications medium to create a portable device application, wherein said portable device application comprises a first selection of said series of templates driven screens, wherein said portable device application is upload to the server and wherein said server based on said first selection of said series of templates driven screens compiles and generates the code by means of the code generator.

2. The system according to claim 1 wherein said portable device module comprises a wearable device.

3. The system according to claim 1 wherein said app-creation application includes a plurality of wizard-like screens.

4. The system according to claim 1, wherein said app-creation application includes a plurality of tab selections.

5. The system according to claim 1, wherein said series of template driven screens options are selected from the group consisting of, but not limited to, a calendar screen, a details screen, an events screen, an image gallery screen, horizontal and vertical image or content scrolling, single image screen, a survey screen, a poll screen, a chart screen, a simple list, a coverflow screen, a description list, a 2 and 3 option buttons screen, a carousel screen, a sorted list, a contacts list, a list of images, feed data screen from personal information repositories, a location screen, a PDF screen, a URL screen, a dial link, an SMS text link, an e-mail link, a website link, a Google maps link and a YouTube video link.

6. The system according to claim 1, wherein said network communications medium is the Internet.

7. The system according to claim 1, wherein said portable device module is selected from the group consisting of a smartphone, a personal digital assistant, a tablet computer or a wearable device.

8. The system according to claim 1, wherein said first non-transitory computer-usable medium includes a personal web hosting space set-up by said user to store gathered user information and said created portable device application.

9. The system according to claim 1, wherein said app-creation application is coded by an external web hosting at said hosting space.

10. A computer-implemented method for portable device application development, the method comprising:
 a portable device module executing on a processor the steps of:
 receiving from an external hosting space computer code comprising a series templates driven screens;
 selecting a first group of preferred templates driven screens;
 storing at least one app information from the group selected from the first group of preferred templates driven screen, images, multimedia, and user preferences;
 submitting a data network request including said app information to the external hosting space;
 automatically generating computer code comprising a plurality of application screens corresponding to the app information;
 storing at least one updated app information from the group selected from the first group of preferred templates driven screen, images, multimedia, and user preferences;
 submitting a data network request including said updated app information to the external hosting space;
 automatically generating updater computer code comprising a plurality of application screens corresponding to the updated app information.

11. The method according to claim 10, wherein said at least one app information is gathered from a plurality of wizard-like screens.

12. The method according to claim 10, wherein said at least one app information is gathered from a plurality of tab selections.

13. The method according to claim 10, wherein said first group of preferred templates are selected from the group consisting of, but not limited to, a calendar screen, a details screen, an events screen, an image gallery screen, horizontal and vertical image or content scrolling, single image screen, a survey screen, a poll screen, a chart screen, a simple list, a coverflow screen, a description list, a two option buttons screen, a three option buttons screen, a carousel screen, a sorted list, a contacts list, a list of images, feed data screen from personal information repositories a location screen, a PDF screen, a URL screen, a dial link, an SMS text link, an e-mail link, a website link, a maps link and an Internet video link.

14. The method according to claim 10, wherein said portable device module are selected from the group consisting of a smartphone, a personal digital assistant, a tablet computer or a wearable smart device.

* * * * *